Sept. 1, 1931.   P. VANDEVEER   1,821,127
CLUTCH
Filed June 11, 1928
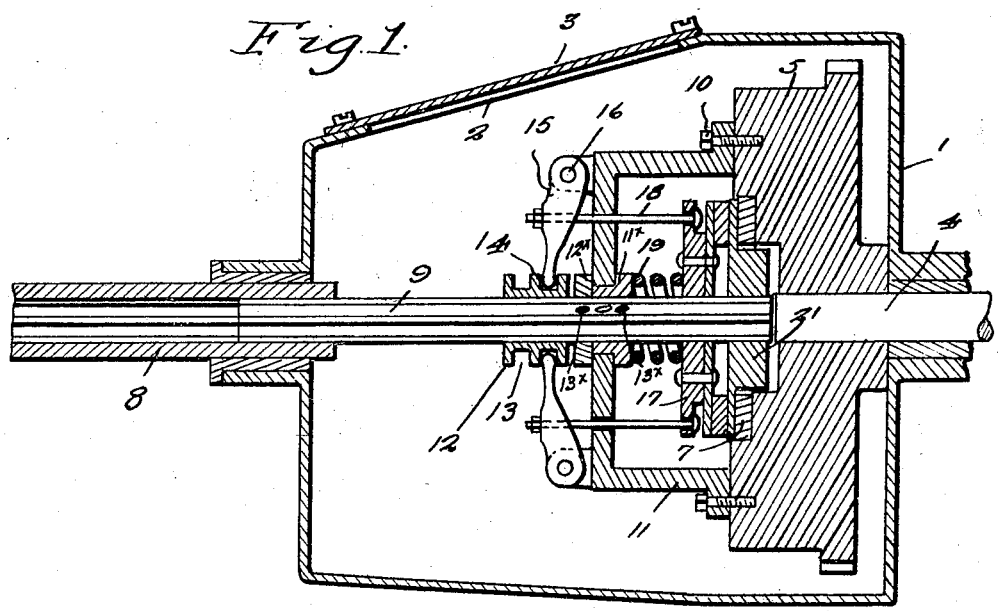
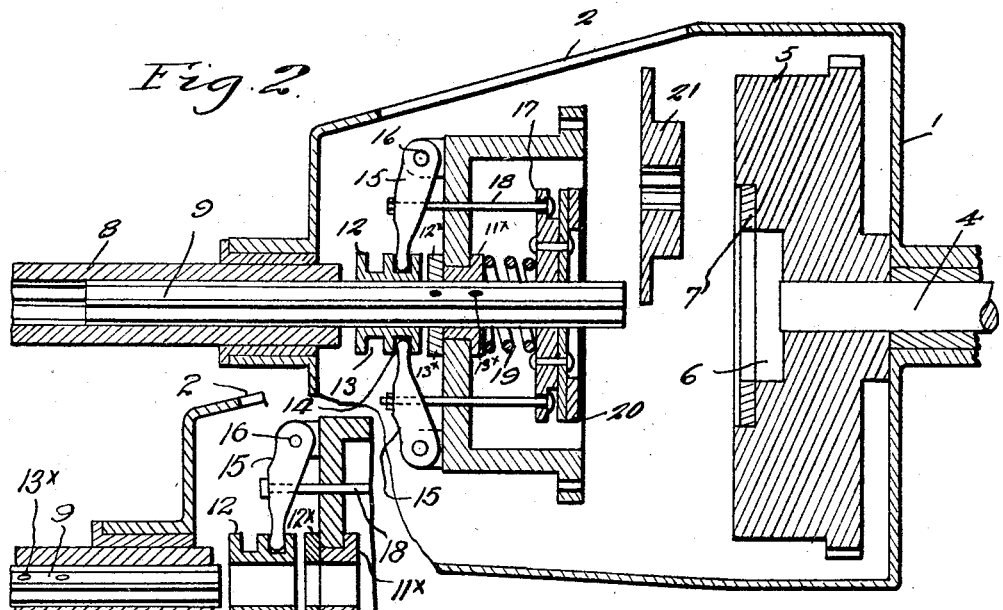
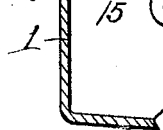
Inventor
Perry Vandeveer Patented Sept. 1, 1931

1,821,127

UNITED STATES PATENT OFFICE

PERRY VANDEVEER, OF LOUISVILLE, KENTUCKY, ASSIGNOR OF ONE-HALF TO AUSTIN E. WALSH, OF LOUISVILLE, KENTUCKY

CLUTCH

Application filed June 11, 1928. Serial No. 284,628.

The object of my invention is the provision of a clutch construction calculated to lend itself to ready replacement of the friction creating annuli or other repair of a clutch as employed in automobiles, and by so doing greatly lessen the labor cost of clutch repair, and also calculated to permit of the entire clutch being readily removed and as readily replaced with a new clutch.

To the attainment of the foregoing, the invention consists in the improvement as hereinafter described and definitely claimed.

In the accompanying drawings, forming part of this specification:—

Figure 1 is a view partly in longitudinal section and partly in elevation illustrating the preferred embodiment of my invention.

Figure 2 is a view similar to Figure 1 but with the parts of the clutch so arranged as to permit of ready access being had to the friction creating annuli of the clutch, said Figure 2 also showing the cover for the hole in the casing removed.

Figure 3 is a detail section showing the shaft section 9 in the section 8 and with the end of said section 9 withdrawn from the collar 12.

Similar numerals of reference designate corresponding parts in both views of the drawings.

I show in the drawings a casing 1 having an opening 2, designed to be normally closed by a detachably secured cover 3. I also show a shaft section 4 journaled in the forward portion of the casing 1 and having fixed thereon a fly wheel 5 characterized in its rear side with a depression 6, preferably stepped as illustrated, and designed to carry in its outer portion a friction creating annulus 7, which within the purview of my invention may be of any appropriate material. The shaft 4 is designed to be connected with and rotated by an engine, not illustrated.

Journaled in the rear portion of the casing 1 is a tubular shaft section 8 which is designed to be connected in the conventional or any other approved manner with a transmission not illustrated. The tubular section 8 is designed to be splined to a longitudinally ribbed shaft section 9 which it receives, and this in such manner that while the sections 8 and 9 are capable of turning about an axis as one piece, the section 9 telescopically arranged in the section 8 is capable of being moved endwise from the position shown in Figure 1 to that shown in Figure 2 and vice versa, and is also adapted to be entirely disposed in the section 8, though I have not deemed it necessary to illustrate the last capacity of function since if the section 8 is sufficiently long the section 9 can obviously be completely sheathed in it.

Detachably connected at 10 to the fly wheel 5 is a clutch housing 11, and mounted to slide on and turn with the said section 9 in the rear of the housing 11 is a throw off collar 12 circumferentially grooved at 13 for the engagement of actuating means, not illustrated. The throw-off collar 12 is also circumferentially grooved at 14, the latter groove being for the reception of the inner ends of levers 15 fulcrumed at 16 on the housing 11.

Loose on the shaft section 9 and disposed in the housing 11 is a clutch member 17 which is connected by longitudinally disposed rods 18 with the beforementioned levers 15. A spring 19 of expansion type and which surrounds the shaft section 9 is interposed between the rear wall of the housing 11 and the clutch member 17. The clutch member 17 is provided on its forward side with a friction creating annulus 20 which is detachably connected to the face of the member 17 in any manner compatible with the purpose of my invention.

Splined to and removably arranged on the shaft section 9 is the interposed member 21 of my novel clutch shaft construction, said member 21 being preferably of appropriate metal and being designed to be readily removed from the section 9 for the purpose hereinafter set forth.

When the parts of my improved construction are positioned as shown in Figure 1 rotary motion will manifestly be transmitted from the shaft section 4 through the annuli 7 and 20 and the clutch member 21 to the said section 9 and through the said shaft section 9 to the shaft section 8. When, however, the throw-off collar 12 is retracted or moved rearwardly in conventional manner, the clutch member 21 will be relieved of pressure by the member 17 being retracted against the action of the spring 19 and consequently the clutch engagement between the shaft section 4 and the shaft section 9 will be interrupted.

Figures 2 and 3 bring out clearly the capacity of my improvement for the purpose stated, for by reference to said figures it will be readily understood that following disconnection of the housing 11 from the fly wheel 5, the shaft section 9 may be retracted or sheathed in the tubular shaft section 8 and all of the parts complementary to the housing 11 may be drawn or moved rearwardly into a position in spaced relation to the fly wheel 5. With the housing 11 and the parts therein positioned as shown in Figure 2, the clutch member 21 may be expeditiously and easily removed from the shaft section 9 to afford ready access to the annulus 20 whereupon said annulus 20 may be expeditiously and easily disconnected from the clutch member 17 and a new annulus as 20 may as readily be connected to the clutch member 17. It will also be understood that when the shaft section 9 is retracted as in Figure 2, and whether or not the member 21 is removed from the shaft section 9, ready access may be gained to the annulus 7 for the removal of said annulus 7 from the fly wheel 5 and the placing of a fresh annulus as 7 in the depression of the fly wheel 5.

It will be appreciated from the foregoing that the important feature of my invention resides in the shaft sections 8 and 9 and the adaptability of the shaft section 9 to be moved rearwardly into the shaft section 8, Figure 2, because when the said shaft section 9 is positioned as shown in Figure 2 ready access may be had to the annuli 20 and 7 as well as to other parts of the clutch mechanism for attention or repair.

The rear wall of the housing 11 is formed in part by a flanged collar 11x which serves in conjunction with a rear collar 12x to hold the housing in swivel-connection manner on the shaft section 9; the collars 11x and 12x being detachably secured to said shaft section 9 by set screws 13x or other appropriate fasteners. Manifestly when the fasteners 13x are removed the entire shaft section 9 may be slipped back into the shaft section 8, thereby permitting of the entire clutch being lifted as a unit out of the casing 1, and, after repair or rebuilding of the clutch, being put back into working position and secured on section 9. In some makes of clutches it is highly desirable for a mechanic to be able to take out the clutch and completely rebuild it. It also follows from the said capacity of function that it is feasible for garages to keep on hand a few rebuilt or new clutches of different models, and then when a customer appears with a clutch in need of repair, the shaft section 9 can be disconnected and entirely telescoped in the section 8, and the old clutch can be removed and a new or rebuilt clutch put in its place and this expeditiously and at small labor cost.

Notwithstanding the practical advantages ascribed to my novel clutch construction, it will be noted that the said construction is simple and compact and in general is well adapted to withstand the usage to which automobile clutch constructions are ordinarily subjected.

I have specifically described the preferred embodiment of my invention in order to impart a full, clear and exact understanding of the said embodiment. I do not desire, however, to be understood as limiting myself to the specific construction and relative arrangement of the parts of my improvement as disclosed, my invention being defined by my appended claims within the scope of which modifications may be made without departure from my invention.

Having described my invention what I claim and desire to secure by Letters-Patent, is:—

1. In a clutch construction and in combination, a casing, a shaft section journaled in one portion of the casing, a tubular shaft section journaled in an opposite portion of the casing and aligned with the first-named shaft section, a shaft section splined and movable endwise in said tubular shaft section, and also aligned with the first-named shaft section, a clutch portion carried by the first-named shaft section and disposed in the casing, a clutch portion detachably connected with the first-named clutch portion and loose on the third-named shaft section, and a clutch portion splined on and removable from the third-named shaft section and interposed between the other clutch portions, whereby when the second-named clutch portion is disconnected from the first-named clutch portion and moved away from the same; and the third-named shaft section is moved away from the first-named shaft section, the third-named clutch portion is rendered accessible and can be removed from the third-named shaft section.

2. In a clutch construction and in combination, a casing, a shaft section journaled in one portion of the casing, a tubular shaft section journaled in an opposite portion of the casing and aligned with the first-named shaft section, a shaft section splined and movable endwise in said tubular shaft section, and also aligned with the first-named shaft section, a clutch portion carried by the first-named shaft section and disposed in the casing, and a clutch portion adapted to be engaged with and disengaged from the first named clutch portion and connected with the third named shaft section whereby when the clutch portions are disconnected and the third named shaft section is moved away from the first named shaft section the clutch portions will be separated, the clutch portion on the first named shaft section including a fly wheel and a friction creating annulus carried thereby, and the clutch portion connected with the third named shaft section being made up of a housing loose on said shaft section, a clutch member spring influenced and loose on the third named shaft section, a friction creating annulus on said clutch member, and a clutch member splined on and removable from the third named shaft section and adapted for use in interposed relation between said friction creating annuli, and means for retracting the spring influenced clutch member against the action of its spring.

3. In a clutch construction and in combination, a casing, a shaft section journaled in one portion of the casing, a tubular shaft section journaled in an opposite portion of the casing and aligned with the first-named shaft section, a shaft section splined and movable endwise in said tubular shaft section, and also aligned with the first named shaft section, a clutch portion carried by the first-named shaft section and disposed in the casing, and a clutch portion detachably connected with the first-named clutch portion and connected with the third-named shaft section whereby when said clutch portions are disconnected and the third-named shaft section is moved away from the first-named shaft section the clutch portions will be separated; the clutch portion connected with the third-named shaft section being removable therefrom to permit of the said shaft section being sheathed in the tubular section and the clutch portion being lifted out of the casing.

4. In a clutch construction and in combination, a casing, a shaft section journaled in one portion of the casing, a tubular shaft section journaled in an opposite portion of the casing and aligned with the first-named shaft section, a shaft section splined and movable endwise in said tubular shaft section, and also aligned with the first-named shaft section, a clutch portion carried by the first-named shaft section and disposed in the casing, and a clutch portion detachably connected with the first-named clutch portion and connected with the third-named shaft section whereby when the clutch portions are disconnected and the third-named shaft section is moved away from the first named shaft section the clutch portions will be separated, the clutch portion on the first named shaft section including a fly wheel and a friction creating annulus carried thereby, and the clutch portion connected with the third named shaft section being made up of a housing detachably connected to the fly wheel, a clutch member spring influenced and loose on the third named shaft section, a friction creating annulus on said clutch member, a clutch member splined on and removable from the third named shaft section and adapted for use in interposed relation between the friction creating annuli, and means for retracting the spring influenced clutch member against the action of its spring; the housing being removably held on the third named shaft section by collars detachably fastened to said shaft section.

5. In a clutch construction, the combination of drive means including a fly wheel and a friction-creating device carried by and removable from said wheel, a housing detachably connected to said fly wheel, driven means including shaft sections telescopically arranged and splined together and one of which is connected with the housing for endwise movement therewith, a spring-influenced clutch member in the housing and loose on the shaft section movable endwise with the housing, means for moving said member, removable friction-creating means on said member, and a member splined on the shaft section that is movable endwise with the housing and interposed between the two said friction-creating means.

6. In a clutch construction, the combination of drive means including a fly wheel and a friction-creating device carried by and removable from said wheel, a housing detachably connected to said fly wheel, driven means including shaft sections telescopically arranged and splined together and one of which is connected with the housing for endwise movement therewith, a spring-influenced clutch member in the housing and loose on the shaft section movable endwise with the housing, means for moving said member, removable friction-creating means on said member, and a member splined on the shaft section that is movable endwise with the housing and interposed between the two said friction-creating means, and removable from its shaft section.

7. In a clutch construction, the combination of drive means including a fly wheel and a friction-creating device carried by and removable from said wheel, a housing detachably connected to said fly wheel, driven means including shafts sections telescopically arranged and splined together and one of which is connected with the housing for endwise movement therewith, a spring-influenced clutch member in the housing and loose on the shaft section movable endwise with the housing, means for moving said member, removable friction-creating means on said member, and a member splined on the shaft section that is movable endwise with the housing and interposed between the two said friction-creating means; the said housing being detachable and removable from its shaft section, and the interposed clutch member being also removable from its shaft section.

8. In a clutch construction, the combination of telescopically arranged shaft sections splined together and one of which is capable of being sheathed in the other, and clutch means on and detachable from the said shaft section that is adapted to be sheathed to permit of such sheathing.

9. In a clutch construction, the combination of telescopically arranged shaft sections splined together and one of which is adapted to be sheathed in the other, and clutch means on and detachable from the said shaft section that is adapted to be sheathed to permit of such sheathing, with a third shaft section, friction-creating means carried thereby and removable, friction-creating means on and removable from the first-named clutch means, and a clutch member interposed between the two friction-creating means and splined on and removable from the shaft section that is adapted to be sheathed.

10. The combination in a clutch construction, of drive means and driven means, one of which comprises telescopically arranged shaft sections splined together, clutch means carried by the drive means, clutch means carried by the driven means, one of said clutch means being movable toward and from the other, and a clutch member interposed between said clutch means and movable by one of the same splined on and movable lengthwise of one of said shaft sections.

11. In a clutch construction, the combination of telescopically arranged shaft sections splined together and one of which is adapted to be sheathed in the other, and clutch means on and detachable from the said shaft section that is adapted to be sheathed to permit of such sheathing, with a third shaft section, clutch means thereon, and a clutch member interposed between the said clutch means and splined on and removable from the shaft section that is adapted to be sheathed.

12. The combination in a clutch construction of drive means and driven means, one of which comprises telescopically arranged shaft sections splined together, clutch means carried by the drive means, clutch means carried by the driven means, one of said clutch means being movable toward and from the other, and a clutch member interposed between said clutch means and movable by one of the same and splined on and movable lengthwise of one of said shaft sections and removable from the end thereof.

In testimony whereof I affix my signature.

PERRY VANDEVEER.